US007121775B2

(12) United States Patent
Onose et al.

(10) Patent No.: US 7,121,775 B2
(45) Date of Patent: Oct. 17, 2006

(54) PORTABLE ELECTRIC TOOL

(75) Inventors: Akira Onose, Ibaraki (JP); Hiroki Uchida, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 11/107,882

(22) Filed: Apr. 18, 2005

(65) Prior Publication Data

US 2005/0232719 A1 Oct. 20, 2005

(30) Foreign Application Priority Data

Apr. 19, 2004 (JP) .......................... P2004-122465

(51) Int. Cl.
*B23C 1/20* (2006.01)

(52) U.S. Cl. ................ 409/182; 409/210; 144/136.95; 30/377

(58) Field of Classification Search ................ 409/182, 409/181, 175, 206, 210, 214, 218; 144/136.95, 144/154.5; 30/166.3, 371, 375, 377, 511
See application file for complete search history.

(56) References Cited

U.S. PATENT DOCUMENTS

| | | | | |
|---|---|---|---|---|
| 2,867,251 | A * | 1/1959 | Moretti et al. | 144/154.5 |
| 4,025,064 | A * | 5/1977 | Disston et al. | 269/87.3 |
| 4,290,464 | A * | 9/1981 | Marsan | 144/136.95 |
| 4,319,860 | A * | 3/1982 | Beares | 409/182 |
| 4,652,191 | A * | 3/1987 | Bernier | 409/182 |
| 5,074,724 | A * | 12/1991 | McCracken | 409/182 |
| 5,181,813 | A * | 1/1993 | McCracken | 409/182 |
| 5,370,165 | A * | 12/1994 | Stornetta | 144/136.95 |
| 5,662,440 | A * | 9/1997 | Kikuchi et al. | 409/182 |
| 5,833,409 | A * | 11/1998 | Giacometti et al. | 409/182 |
| 5,853,273 | A * | 12/1998 | Coffey | 409/182 |
| 5,853,274 | A * | 12/1998 | Coffey et al. | 409/182 |
| 5,913,645 | A * | 6/1999 | Coffey | 409/182 |
| D487,009 | S * | 2/2004 | Hessenberger et al. | D8/67 |
| D489,592 | S * | 5/2004 | Hessenberger et al. | D8/67 |
| 6,733,216 | B1 * | 5/2004 | Bohringer | 144/136.95 |
| 6,779,954 | B1 * | 8/2004 | Tomayko | 409/182 |
| 6,835,030 | B1 * | 12/2004 | Pozgay et al. | 408/182 |
| D511,079 | S * | 11/2005 | Ozawa et al. | D8/67 |
| 2006/0008334 | A1 * | 1/2006 | Kageler et al. | 409/182 |
| 2006/0086417 | A1 * | 4/2006 | Griffin et al. | 144/136.95 |

FOREIGN PATENT DOCUMENTS

| | | | |
|---|---|---|---|
| JP | 59-118504 | U * | 8/1984 |
| JP | 2001-96505 | A * | 4/2001 |

* cited by examiner

*Primary Examiner*—Erica Cadugan
(74) *Attorney, Agent, or Firm*—McGinn IP Law Group, PLLC

(57) ABSTRACT

A portable electrical tool includes a tip tool; a cylindrical housing accommodating a motor including a chuck attachably and detachably holding the tip tool at tip end of a rotation shaft; a base including a surface plate which slides on an upper surface of work material, and which allows the tip tool to protrude from the surface plate downwardly, a cylindrical portion including a cutout portion, and a lever having a cam surface, and rotatable to a fixed position and a release position. When the lever is in the fixed position, a gap at the cutout portion is narrowed to stop movement of the cylindrical housing. When the lever is in the release position, the cylindrical housing is movable by weight in the cylindrical portion. The tool includes a stopper to stop a rotation of the lever between the fixed position and the release position.

8 Claims, 3 Drawing Sheets

PORTABLE ELECTRIC TOOL

BACKGROUND OF THE INVENTON

1. Field of the Invention

The present invention relates to a portable electric tool such as a portable router or a portable trimmer having a lever for fixing a housing to a base.

2. Description of the Related Art

For example, a conventional portable electrical tool such as a portable router or a portable trimmer has the structure including a motor, a cylindrical housing which accommodates the base, and has a chuck provided at a tip of a rotation shaft of the motor for detachably holding a tip tool, and a base having a surface plate which slides on an upper surface of work material and allows the tip tool to protrude from the surface plate downwardly (for example, see JP-U-59-118504), and a cylindrical portion including a cutout portion to have a substantially C-shaped cross section.

In the portable electric tool having this structure, a bolt provided at the cylindrical portion is rotated to deform the cylindrical portion having the C-shape to fix the cylindrical housing for preventing movement of the cylindrical housing in the cylindrical portion or to allow for movement of the cylindrical housing in the cylindrical portion. With the structure, the amount of protrusion of the tip tool from a surface plate, i.e., the cutting depth is adjustable.

SUMMARY OF THE INVENTION

In the conventional portable electric tool, in order to bring the cylindrical housing from the state in which the cylindrical housing is movable in the cylindrical portion to the state in which the cylindrical housing is not movable in the cylindrical portion, the bolt is rotated so that the cylindrical portion is deformed gradually. However, since a force of the cylindrical portion to restore its shape to the initial shape is applied to the bolt, it is necessary to rotate the bolt with a very large force, and operability is not good.

In an attempt to achieve improvement in operability, some portable electric tools have a structure in which the lever having a cam surface is provided, and when the lever is in the fixed position, the cylindrical housing is fixed, and does not move in the cylindrical portion. However, in the structure, when the lever moves from the fixed position, due to the restoration force of the cylindrical portion, the lever immediately moves to the release position, and the cylindrical housing falls off, and is detached from the cylindrical portion by its own weight.

The positional adjustment in the amount of protrusion of the cutting tool from the surface plate is performed when the lever is released. It is difficult to move the lever from the release position to the fixed position while maintaining the positional relationship between the cylindrical housing and the cylindrical portion. At the time of handling the lever, the adjusted cutting depth tends to be displaced slightly.

An object of the present invention is to provide a portable electric tool having good operability which solves the problems as described above and which makes it possible to adjust the cutting depth accurately and easily.

The object is achieved by providing a stopper for stopping rotation of the lever at a position between a fixed position and a release position. When the lever is stopped, the lever is in a provisional fixed state in which movement of the cylindrical housing in the cylindrical portion is limited.

According to one aspect of the present invention, it is possible to provide a portable electric tool having good operability which makes it possible to adjust the cutting depth accurately and easily.

DESCRIPTION OF THE PREFERRED EMBODIMENTS

Figure 1:
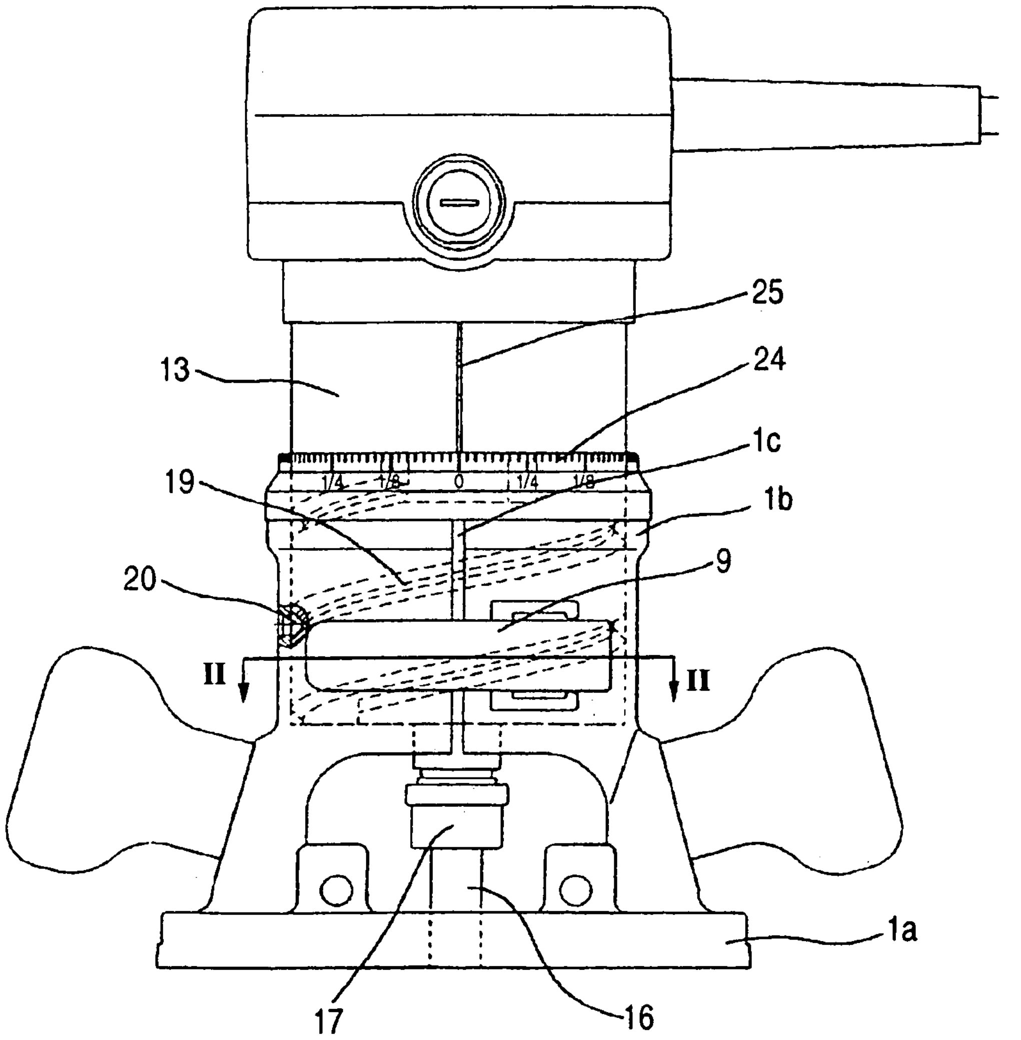
FIG. 1 is a front view showing a portable electric tool according to an embodiment of the present invention.
Figure 2:
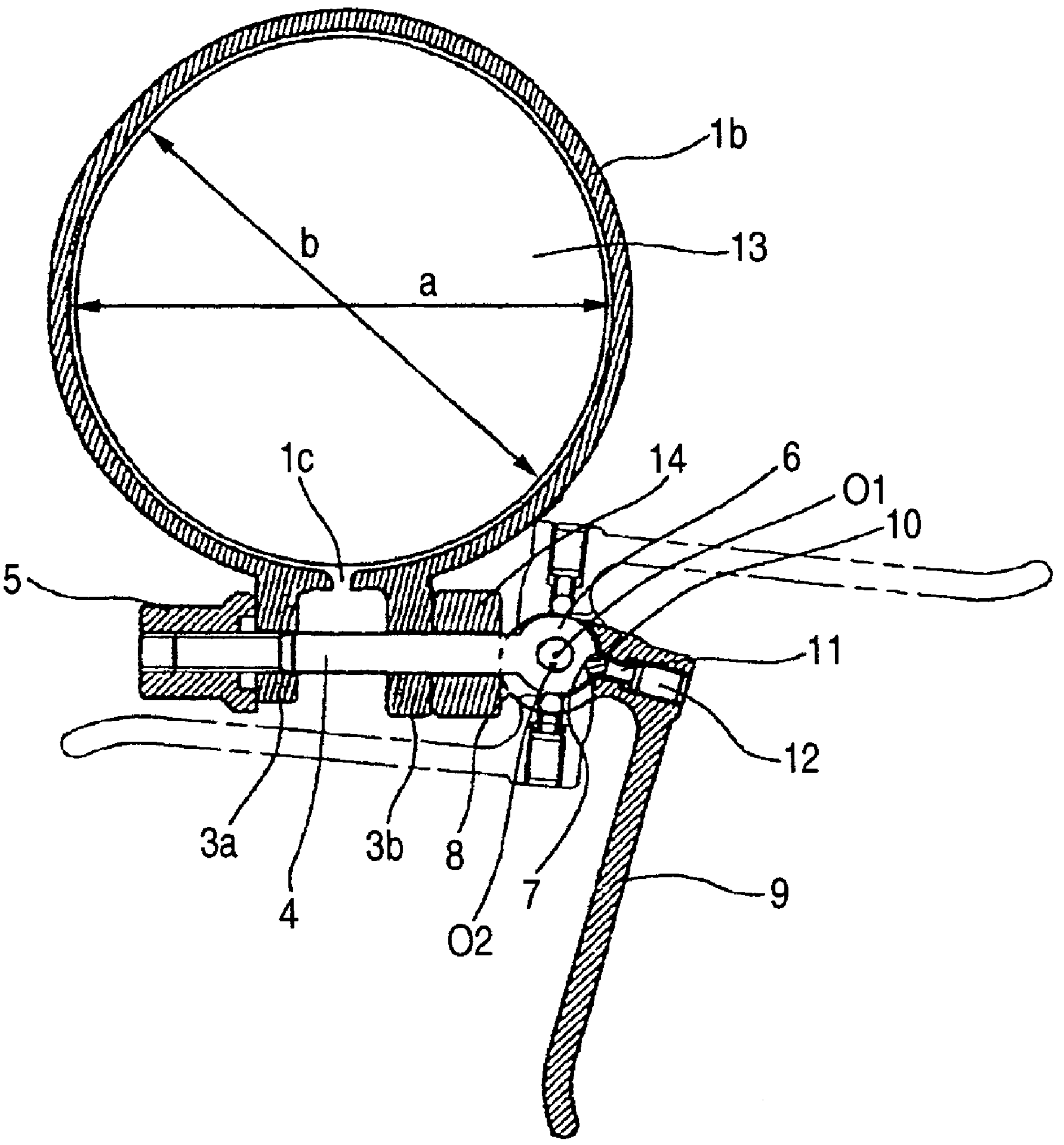
FIG. 2 is a view showing a cross sectional view taken along a line II—II in FIG. 1.

A portable router as an example of a portable electric tool according to an embodiment of the present invention will be described with reference to FIGS. 1 and 2. FIG. 1 is a front view showing the portable router according to the embodiment of the present invention. FIG. 2 is a cross sectional view taken along a line II—II in FIG. 1.

As shown in the drawings, the portable router includes a cylindrical housing 13 and abase 1. The cylindrical housing 13 accommodates a motor (not shown) and has a chuck 17 for detachably holding a tip tool 16 provided at a tip of a rotation shaft of the motor. The base 1 includes a surface plate 1*a* which is slidable on an upper surface of work material and the tip tool 16 which can protrude from the surface plate 1*a* downwardly, and the cylindrical portion 1*b* of which a cutout portion 1*c* is a substantially C-shaped cross section as shown in FIG. 2.

The dimension "a" of the inner diameter of the cylindrical portion 1*b* of the base 1 is larger than the dimension "b" of the outer diameter of the cylindrical housing 13. A threaded portion 19 of the outer diameter portion of the cylindrical housing 13 is screw-engaged with pins 20 provided at four positions along a spiral line of the inner diameter portion of the base 1. When the cylindrical housing 13 rotates, the cylindrical housing 13 moves up and down with respect to the base 1.

As shown in FIG. 2, the cylindrical portion 1*b* of the base 1 has a pair of protrusions 3*a* and 3*b* provided at positions sandwiching the cutout portion 1*c*, and protrude outwardly in a radial direction. Further, a shaft member 4 is held by the protrusions 3*a* and 3*b*, and extends across the cutout portion 1*c*. A fixing force adjustment nut 5 is screw-engaged with one end of the shaft member 4 and contacts a side surface of the protrusion 3*a* so as to be formed in a shape so as to rotate without any tool. At the other end of the shaft member 4, a rotation supporting point 01 extending in a direction perpendicular to the shaft member 4 is provided. Part of the shaft member 4 around the rotation supporting point O1 is provided with a circular arc portion 6 having a circular arc shape around the rotation supporting point O1. Further, a spherical recess 7 is provided on the circular arc portion 6.

A lever 9 is rotatably attached to the rotation supporting point O1. The lever 9 has a circular arc shaped cam surface 8 around a position O2 deviated from the rotation supporting point O1. Thus, the lever 9 is rotatable to be supported by the shaft member 4.

At the rotational position shown by a two dotted-line in the upper portion of FIG. 2, i.e., the lever 9 is in a release position, the cylindrical housing 13 is movable in the cylindrical portion 1*b* by its own weight. At the rotational position shown by a one-dotted chain line in the lower portion in FIG. 2, i.e., the lever 9 is in a fixed position, the gap at the cutout portion 1*c* is narrowed, thereby the movement of the cylindrical housing 13 in the cylindrical portion 1*b* is stopped. The rotational position of the lever 9 shown by a solid line in FIG. 2 is in the provisional fixed position.

When the lever 9 rotates to the fixed position, part of the cam surface 8 remote from the rotation supporting point 01 rotates toward the protrusion 3*b*. The cylindrical portion 1*b* of the base 1 is deformed so that the gap at the cutout portion 1*c* and the protrusions 3 are narrowed. When the cam surface 8 moves to a position which exceeds the maximum distance from the rotation supporting point O1 to some extent, a grip portion of the lever 9 abuts against the protrusions 3 of the base 1 or the like, and rotation of the lever 9 is stopped. Thus, the cylindrical housing 13 is fixed.

When the lever 9 rotates to the release position, part of the cam surface 8 near the rotation supporting point O1 rotates toward the protrusion 3*b*, and the cylindrical portion 1*b* of the base 1 is deformed by its restoration force to widen the gap at the cutout portion 1*c* and the protrusions 3*a* and 3*b* to release fixing of the cylindrical housing 13.

A ball 10 is provided near the rotation supporting point O1 of the lever 9 at a position where the ball 10 is engageable with the recess 7, and rotatable. Further, a spring 11 and a screw 12 as a biasing member for biasing the ball 10 are provided. In the structure, when the recess 7 is engaged with the ball 10, rotation of the lever 9 is stopped.

The position of the recess 7 is determined so that the housing 13 is provisionally fixed, i.e., so that the recess 7 is engaged with the ball 10 at a position where the housing 13 does not fall by its own weight.

The provisional fixing state of the housing 13 may vary to some extent depending on the product due to dimensional variations of components, such as dimensional variations of the gap between the inner diameter of the cylindrical portion 1*b* and the outer diameter of the housing 13. However, the provisional fixing state may be adjusted, e.g., by rotating the fixing force adjustment nut 5. Thus, it is possible to easily achieve the provisional fixing state.

At the time of fixing the housing 13, the fixing force may be excessively large by tightening adjustment of the fixing force adjustment nut 5. A rubber member 14 as a resilient member is interposed between the cam surface 8 and the protrusion 3*b* of the base 1. The rubber member 14 is deformed to achieve a suitable fixing force. Therefore, it is possible to overcome the problem of excessive tightening by the fixing force within the dimensional variation range of components.

In the portable electric router having the above structure, adjustment of protrusion amount of the tip tool 16 from the surface plate 1*a* of the base 1, i.e., adjustment of the cutting depth is carried out by the following procedure.

(1) Place the body of the router on a flat surface such as work material as shown in FIG. 1.

(2) Rotate the lever 9 to the release position to release fixing of the cylindrical housing 13.

(3) Move the cylindrical housing 13 until the tip tool 16 contacts the work material (achieve the state in which the bottom surface of the surface plate 1*a* and the tip of the tip tool 16 are in the same plane).

(4) Rotate a ring 24 so that "0" shown on the ring 24 is matched to a graduation 25 of the cylindrical housing 13.

(5) Move the body of the router from the position on the work material (achieve the state in which the tip tool 16 protrudes from the bottom surface of the surface plate 1*b*).

(6) Rotate the cylindrical housing 13 so that the graduation 25 of the housing 13 is matched to an arbitrary cutting depth of the graduation shown on the ring 24.

(7) Rotate the lever 9 to the fixed position to f ix the cylindrical housing 13.

By the above procedure, it is possible to adjust the cutting depth. While moving the lever 9 from the release position to the fixed position, the housing 13 may rotate slightly. However, in the portable router according to the embodiment of the present invention, fine adjustment of the cutting depth is performed after moving the lever 9 from the release position to the provisional fixed position so that adjustment can be performed accurately. If the lever 9 is in the provisional fixed position, it is not necessary to consider rotation of the housing 13 by its own weight at the time of holding the housing 13. Therefore, the cutting depth is adjusted accurately and easily.

At the time of changing the cutting depth slightly, even if the lever 9 is not placed in the release position, the lever 9 is simply rotated from the fixed position to the provisional fixed position to adjust the cutting depth. Thus, it is possible to adjust the cutting depth easily and accurately without rotation of the housing 13 by its own weight, and without significant change of the cutting depth.

With the above structure, it is possible to stop rotation of the lever 9 at an arbitrary position, and it is possible to set a position where the housing 13 is fixed provisionally, i.e., a position where the housing 13 does not fall by its own weight. Thus, it is possible to provide the portable electric tool having good operability which makes it possible to adjust the cutting depth accurately and easily.

As a stopper for the lever 9, the structure where the ball 10 pressed by the spring 11 is engaged with the spherical recess 7 is adopted. Thus, it is possible to smoothly rotate the lever 9 from the provisional fixed position to the fixed position or the release position.

Further, since the recess 7 is provided on the circular arc around the rotation supporting point of the lever 9, when the recess 7 is not engaged with the ball 10, a constant biasing force is always applied to the ball 10. Thus, it is possible to rotate the lever 9 smoothly.

Figure 3:
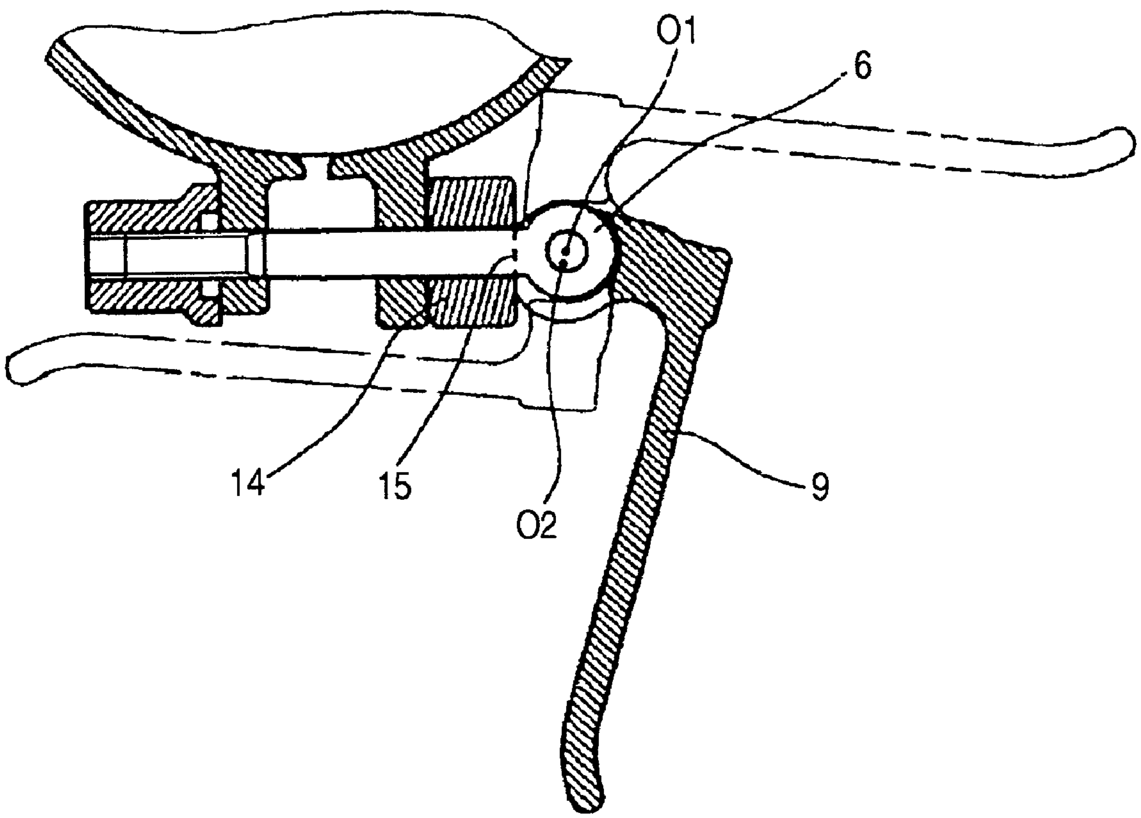
FIG. 3 is a cross sectional view showing main components of a portable electric tool according to another embodiment of the present invention taken along the line in II—II in FIG. 1.

In another embodiment, as shown in FIG. 3, the cam surface 8 of the lever 9 partially includes a flat portion 15. When the flat portion 15 and a resilient member 14 are in the same plane, it is possible to stop rotation of the lever 9. In the structure, the advantages and effects as with the above-described embodiment can be obtained.

What is claimed is:

1. A portable electrical tool comprising:

a tip tool;

a cylindrical housing accommodating a motor including a chuck attachably and detachably holding the tip tool at a tip end of a rotation shaft;

a base including:

a surface plate which slides on an upper surface of work material, and which allows the tip tool to protrude from the surface plate downwardly;

a cylindrical portion including a cutout portion to have a substantially C-shaped cross section; and a lever having a cam surface, and rotatable to a fixed position and a release position, wherein when the lever is in the fixed position, a gap at the cutout portion is narrowed to stop movement of the cylindrical housing in the cylindrical portion, wherein when the lever is in the release position, the cylindrical housing is movable by its own weight in the cylindrical portion, and wherein the portable electric tool further includes a stopper which can stop a rotation of the lever at a position between the fixed position and the release position.

2. The portable electric tool according to claim 1, wherein the lever has a protrusion portion, wherein a support member supporting a rotation of the lever has a recess portion engageable with the protrusion portion of the lever, and wherein the stopper is configured by the protrusion portion of the lever and the recess portion of the support member.

3. The portable electric tool according to claim 2, wherein the protrusion portion of the lever is a ball which is biased by a biasing member toward the support member.

4. The portable electric tool according to claim 2, wherein the recess portion of the support member has a spherical shape.

5. The portable electric tool according to claim 1, wherein the cylindrical portion of the base includes a pair of protrusions protruding outwardly in a radial direction, wherein the cutout portion is positioned between the pair of the protrusions, wherein a support member supporting a rotation of the lever and extending across the cutout portion is provided at the protrusions, wherein an abutment member is provided on one end side of the support member, so that the abutment member can abut against an end surface of one of the protrusions on the side of the one protrusion opposite the cutout portion, and wherein the lever is provided on the other end side of the support member so that the lever can rotate about a rotation supporting point which is extending in a direction perpendicular to the support member.

6. The portable electric tool according to claim 5, wherein a resilient member is interposed between an end surface of the other protrusion on the side of said other protrusion opposite the cutout portion and the cam surface.

7. A portable electric tool comprising:

a tip tool;

a cylindrical housing accommodating a motor including a chuck attachably and detachably holding the tip tool at tip end of a rotation shaft;

a base including:

a surface plate which slides on an upper surface of work material, and which allows the tip tool to protrude from the surface plate downwardly;

a cylindrical portion including a cutout portion to have a substantially C-shaped cross section;

and a lever fixing the cylindrical housing to the base, and having a cam surface, wherein the lever can be positioned in either one of a first fixed state at a fixed position, a second released state at a released position, and a third state between the first state and the second state in which the lever is stopped by a stopper at a position between the fixed and released positions.

8. The portable electric tool according to claim 7, wherein the cylindrical housing is fixed when the lever is in the first state, wherein the cylindrical housing is released to be rotatable by it own weight when the lever is in the second state, and wherein the cylindrical housing is rotatable by an operation of an operator when the lever is in the third state, while the cylindrical housing is not rotatable by its own weight.

* * * * *